United States Patent [19]
Göllner

[11] Patent Number: 5,628,187
[45] Date of Patent: May 13, 1997

[54] METHOD TO CALIBRATE A HYDROSTATIC TRANSMISSION WITH ELECTRONIC CONTROLS

[75] Inventor: Wilhelm Göllner, Neumünster, Germany

[73] Assignee: Sauer Inc., Ames, Iowa

[21] Appl. No.: 666,141

[22] Filed: Jun. 19, 1996

[30] Foreign Application Priority Data

Jul. 6, 1995 [DE] Germany ............ 195 24 669.1

[51] Int. Cl.$^6$ .................................................. F16D 31/02
[52] U.S. Cl. .................. 60/327; 60/445; 60/448; 60/449; 60/452
[58] Field of Search ............... 60/327, 445, 448, 60/449, 452

[56] References Cited

U.S. PATENT DOCUMENTS

| | | | |
|---|---|---|---|
| 5,184,466 | 2/1993 | Schniederjan et al. | 60/448 |
| 5,406,793 | 4/1995 | Maruyama et al. | 60/449 |
| 5,473,895 | 12/1995 | Bausenhart et al. | 60/448 |
| 5,553,453 | 9/1996 | Coutant et al. | 60/327 |

*Primary Examiner*—F. Daniel Lopez
*Attorney, Agent, or Firm*—Zarley, McKee, Thomte, Voorhees & Sease

[57] ABSTRACT

A method for putting into operation a vehicle with an electronically controlled automotive hydrostatic transmission, wherein an output current of an electronic control by means of at least one proportional pressure-reducing valve is used for generating a control pressure acting upon the servo system of the variable displacement pump. The method is performed by the following steps: a) determining a limit value of a driving regime of the vehicle; b) detecting, digitizing and reading-in at least one current operational parameter of the transmission into the electronic control; c) determining and detecting at least one characteristic value of the output current of the electronic control corresponding to the value of the driving regime of the transmission to the one proportional pressure-reducing valve, and d) calculating a current characteristic on the basis of the value of the output current for achieving reproducible driving properties.

14 Claims, 6 Drawing Sheets

METHOD TO CALIBRATE A HYDROSTATIC TRANSMISSION WITH ELECTRONIC CONTROLS

BACKGROUND OF THE INVENTION

This invention relates to a method for setting into operation a vehicle having an electronically controlled automotive hydrostatic transmission, as well as to a control and regulation means therefor.

In case of known driving systems with electronically automotively adjustable pumps, setting the vehicle into operation involves tremendous effort, because the characteristics of all sensors and valves have to be "read-in" in order that the system can operate satisfactorily.

For hydraulically automotive pump controls, the adjustments are realized for known driving systems by means of orifices at the final examination of the variable displacement pumps. The adjustment procedure is influenced by numerous factors. First, these adjustments very often have to be performed by the customers themselves because, for example, different viscosities of the operating media also have to be corrected. There are limitations regarding the adaption of these systems to various applications, which are limited by the complexity and comprehensibility of pure hydraulic controllers.

Therefore, it is the principal object of the present invention to provide a simple method for putting into operation a vehicle having an electronically controlled automotive hydrostatic transmission as well as to provide a control and regulation means working on the basis of said method.

These and other objects will be apparent to those skilled in the art.

SUMMARY OF THE INVENTION

According to the invention, the method for putting into operation a vehicle having an electronically controlled automotive hydrostatic transmission comprises the following steps involving the following structure: The hydrostatic transmission comprises a variable displacement pump driven by an internal combustion engine having a servo system, a hydraulic motor, and an electronic control. The output current of the control is used for generating a control pressure acting upon the servo system of the variable displacement pump by means of at least one proportional pressure-reducing valve. Initially, at least one limit value of a driving regime of the vehicle is defined. A sensor system available at the transmission serves the purpose of detecting, digitizing and reading-in at least one current operational parameter of the hydrostatic transmission into the electronic control. This is followed by determining and storing of at least one characteristic value of the output current of the electronic control with regard to at least one proportional pressure-reducing valve, corresponding to the value of the driving regime of the transmission. On the basis of the value of the output current, a current characteristic for achieving reproducible driving properties is subsequent calculated.

In the preferred embodiment, the characteristic values of the driving regime during the first run of the vehicle after being put into operation, are generated by means of the electronic control which determines an optimum current characteristic.

Preferably the current characteristic is established for a driving regime characterizing the start-up, or a driving regime characterizing the achievement of the maximum high pressure, or a driving regime characterizing the achieving of a borderline speed for speed reduction on the speed characteristic. In order to establish a current characteristic for all operational regimes of the vehicle, it is also possible to put the single parts of the current characteristic together to create a total characteristic. This will provide the basis for reproducible driving properties under changing operational conditions and also with consideration of changing operational media used.

Preferably, as operational parameters the output speed of the internal combustion engine and/or the output speed of the hydraulic motor are used. In addition thereto or separately, the high pressure in the respective working main connecting the variable displacement pump and the hydraulic motor to each other, can also be used.

In another preferred embodiment, at constant speed of the internal combustion engine, the output current to the proportional pressure-reducing valve is increased as long as the high pressure in the working mains is sufficient in order for the vehicle to start moving. Starting-up the vehicle can also be detected by a speed sensor at the hydraulic motor.

In a modified form of the invention, at maximum position of the accelerator and blocked vehicle, the output current to the proportion and pressure-reducing valve is increased as long as the speed of the internal combustion engine has dropped to the borderline speed for speed reduction.

In the control and regulation means for a hydrostatic transmission of this invention, a variable displacement pump with servo system is driven by an internal combustion engine, a hydraulic motor, which are connected to each other through working mains, and an electronic control. The output current of the control controls at least one proportional pressure-reducing valve for controlling the servo system which acts upon the variable displacement pump. Hence a pressure in the working mains and sensors are provided for determining the speed of said internal combustion engine and/or said hydraulic motor and/or for determining the pressure in the working mains. The inventive control and regulation means comprises a diagnosis device used for the set-up of driving regime data in the electronic control. The output current for the proportional pressure-reducing valve corresponding to the values is determined by said sensors being controllable by said electronic control such that, on the basis of said driving regime data and said output current, a current characteristic is generable which reproduces the driving properties of the vehicle reliably and in an optimum way.

Preferably, the sensor for determining the pressure is connected to the working mains through a shuttle valve. In the preferred embodiment, a personal computer or a laptop can be used as diagnosis device.

DESCRIPTION OF THE PREFERRED EMBODIMENT

Figure 1:
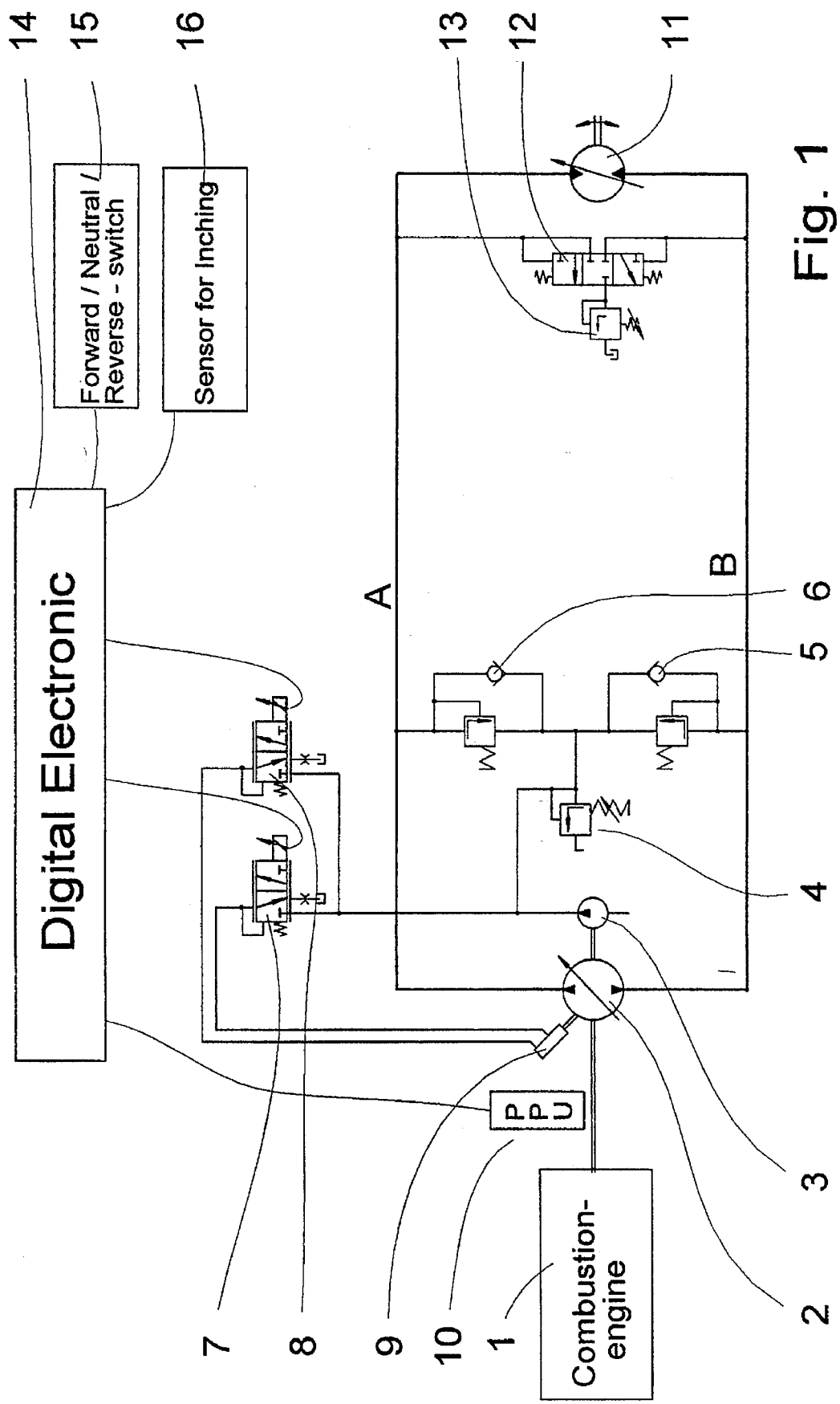
FIG. 1 is a schematic view which shows a first embodiment of a control and regulation device having an electronic control and a speed sensor for the internal combustion engine.

FIG. 1 shows a control and regulation system according to the invention which is provided with an electronic control 14 used in the method of this invention. Such systems are utilized as vehicle power drives for wheel loaders, forklifts, forestry vehicles and others. The variable displacement pump 2 is driven by an internal combustion engine 1 and is connected to the hydraulic motor 11 through the working mains A and B in a closed circuit. The variable displacement pump 2 is integrated with a charge pump 3. The charge pump serves to supply fluid into the closed circuit through the supply valves 5, 6 as well as for supplying fluid to the proportional pressure-reducing valves 7, 8 which triggers the servo system 9 of the variable displacement pump 2. A speed sensor 10 provided for the measurement of the speed of the internal combustion engine 1, generates a speed signal transmitted to said electronic control 14. The electronic control 14 is additionally connected to a driving direction switch 15, and also to an inching sensor, if desired.

For a preselected driving direction, the electronic control 14 supplies a controlled speed-dependent output current to the corresponding proportional pressure-reducing valve 7 or 8. This in turn generates a current proportional control pressure which communicates with a servo side of the servo system 9. With increasing pressure, the servo system 9 starts moving the swashplate of the variable displacement pump 2. The adjusting swashplate angle is dependent on the spring constant of the spring in the servo system 9 as well as on pump-internal forces which, from the axial pistons of the driving mechanism, act on the servo system 9. These forces are high-pressure-dependent and speed-dependent. For optimizing the hydrostatic transmission, it is necessary to properly adapt the output current, (that means the control pressure), which has to be performed dependent on the speed of the internal combustion engine. This relates also to the driving regime, as well as to suitable measures for optimizing the internal forces in connection with the spring forces. This design of conditions is usually done by the manufacturer of the variable displacement pumps. On the basis of this pump-internal basic design, a current characteristic is designed with the aid of the electronic control 14 which results in the desired driving behavior of the vehicle.

Figure 6:
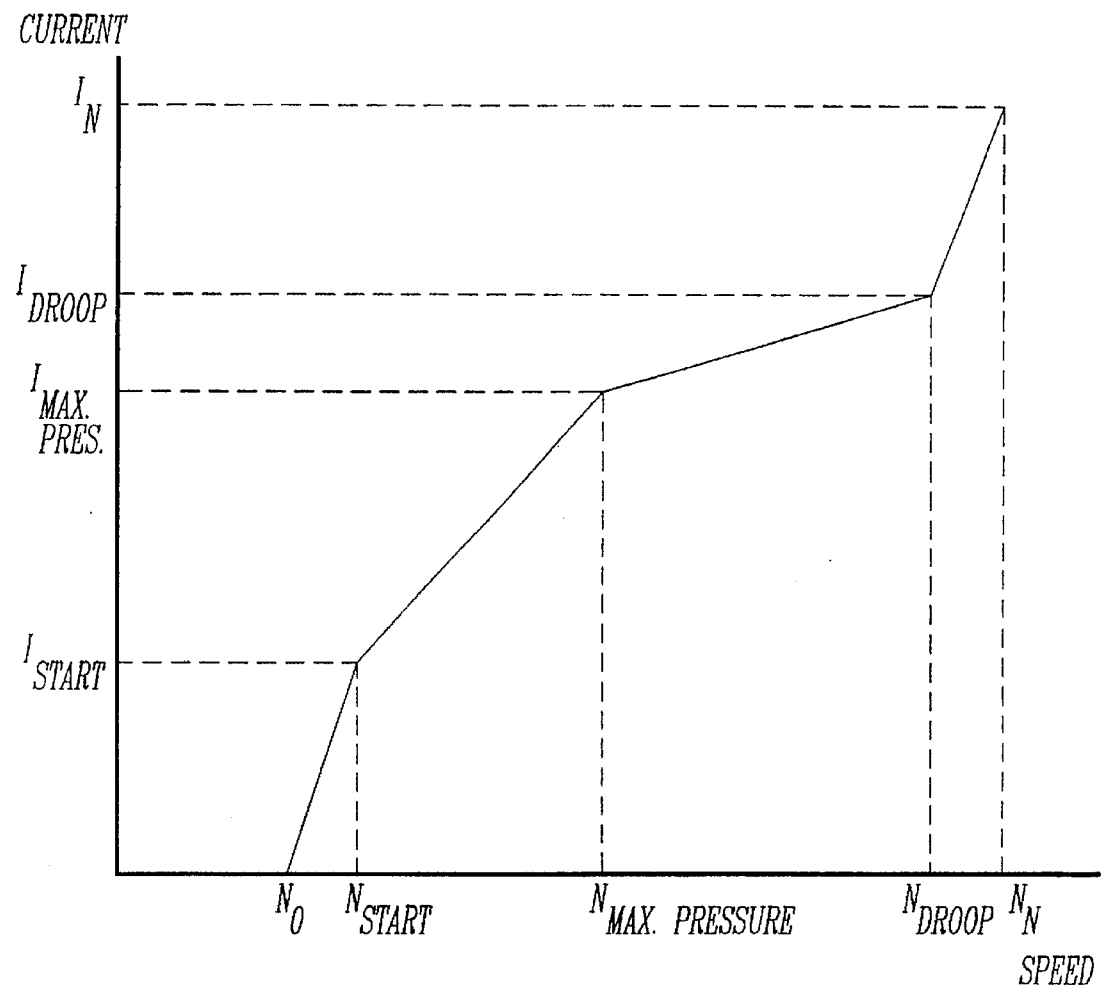
FIG. 6 is a current characteristic graph which is determined in an electronic control.

Such a dependency of the output current of the electronic control 14 on the speed of the internal combustion engine is shown in FIG. 6. A possible curve development is shown in order to realize the characteristic vehicle data such as pulling force and velocity of the vehicle. In an application in series, the use of a basic characteristic, (that means a single main current characteristic,) is not sufficient in order to achieve a process-safe driving behavior. Because of the tolerances of the pump-internal forces, the spring forces and the valve characteristic of the proportional pressure-reducing valves 7 and 8, it is necessary to perform adaptions of the speed-dependent current characteristic. For this purpose, such characteristic values which are used for calculating the current characteristic have to be adapted. Usually the output current from the electronic control 14 has to be adapted in order to achieve a precise start-up speed. If necessary, additional adaptions of the output current, at which the maximum pressure of the system is achieved, may be required, as well as of the current which influences a borderline speed for the speed reduction on the speed characteristic of the internal combustion engine. This depends on the respective desired profiles of the customers or also on the types of vehicles, respectively.

Figure 2:
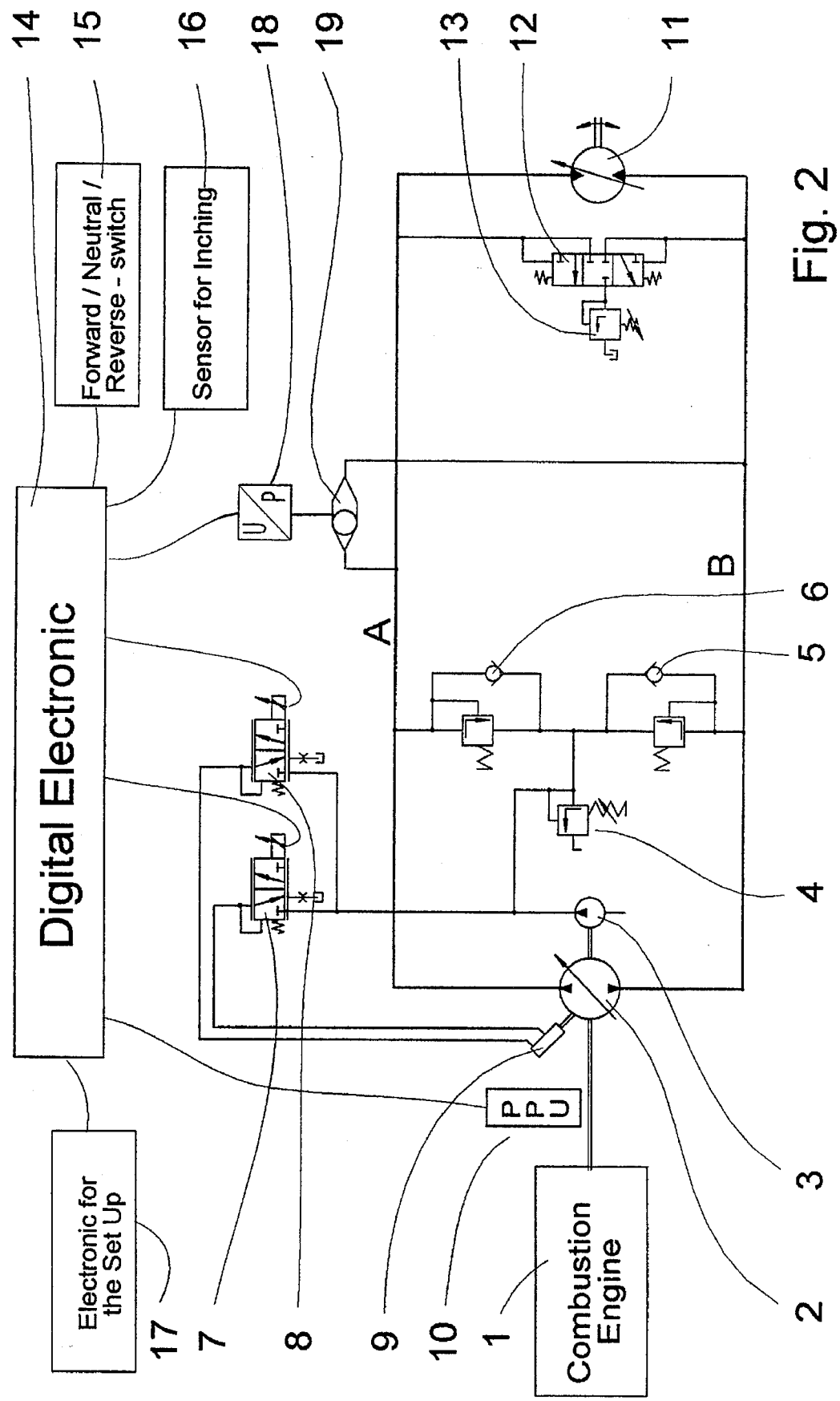
FIG. 2 is a schematic view of a second embodiment of the invention which shows, in addition to the embodiment shown in FIG. 1, a pressure sensor for the working mains and a diagnosis device.
Figure 4:
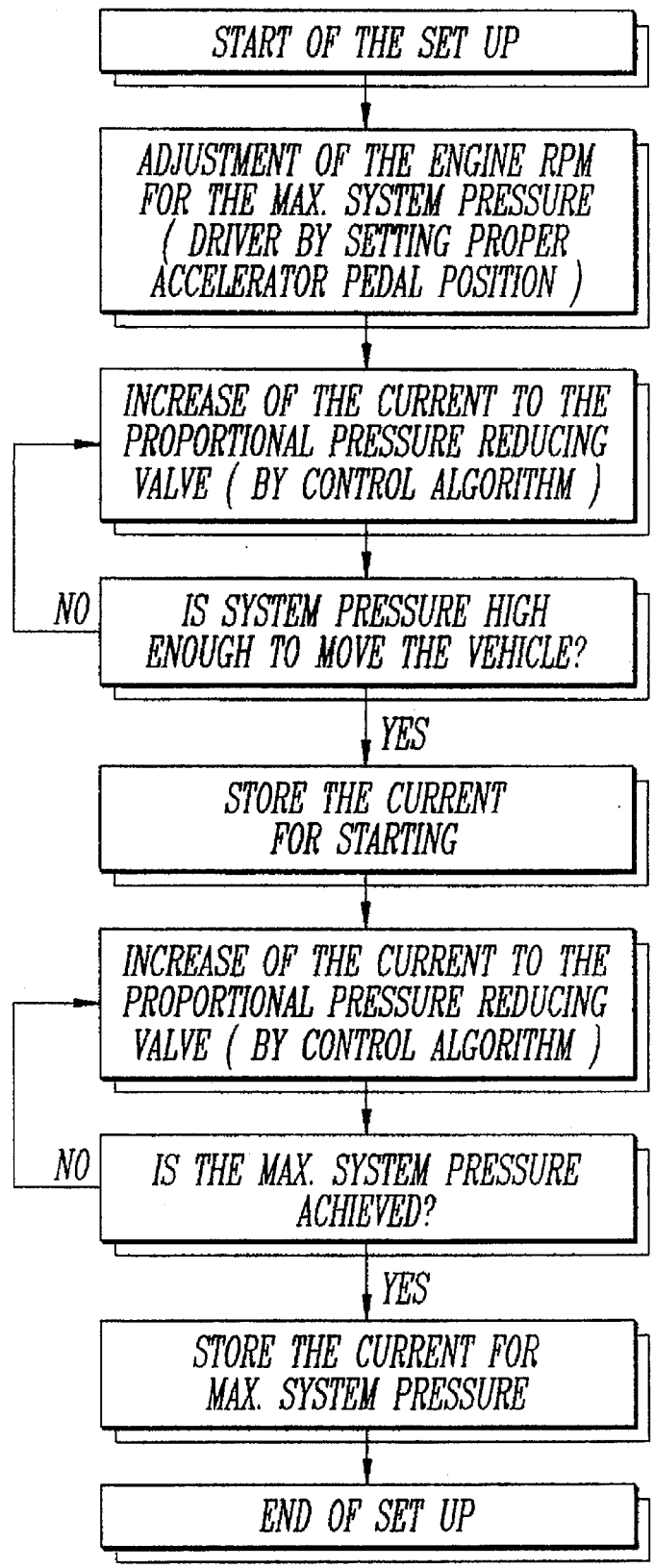
FIG. 4 is a block diagram which shows the procedure of the set-up for the adjustment of the high pressures.

Another embodiment for a control and regulating device for putting into operation a vehicle having an electronically controlled automotive hydrostatic transmission is shown in FIG. 2. In this embodiment, the adaption is enabled by using a pressure sensor 18 which, by means of a shuttle valve 19, is connected to the working mains A and B. The adaption of the start-up is performed when the vehicle is braked at a standstill. For that reason the electronic control 14 is in the so called set-up mode. By means of a diagnosis device 17 communicating with the electronic control 14, the program for performing the set-up mode is started. The procedure of the set-up mode is represented in FIG. 4. As the diagnosis device 17, a personal computer or laptop, respectively, can also be used. After the operator has set the desired start-up speed, the output current to the proportional pressure-reducing valves 7, 8 is increased by means of the program contained in the electronic control 14 as long as a certain pressure is indicated by the pressure sensor 18 in the respective working main A or B, respectively. A common pressure at which a vehicle starts moving in a plane is in the range of 50 bar. This procedure can be performed both for forward motion as well as backward motion as well as for the speed at which the maximum high pressure is to be achieved.

Figure 5:
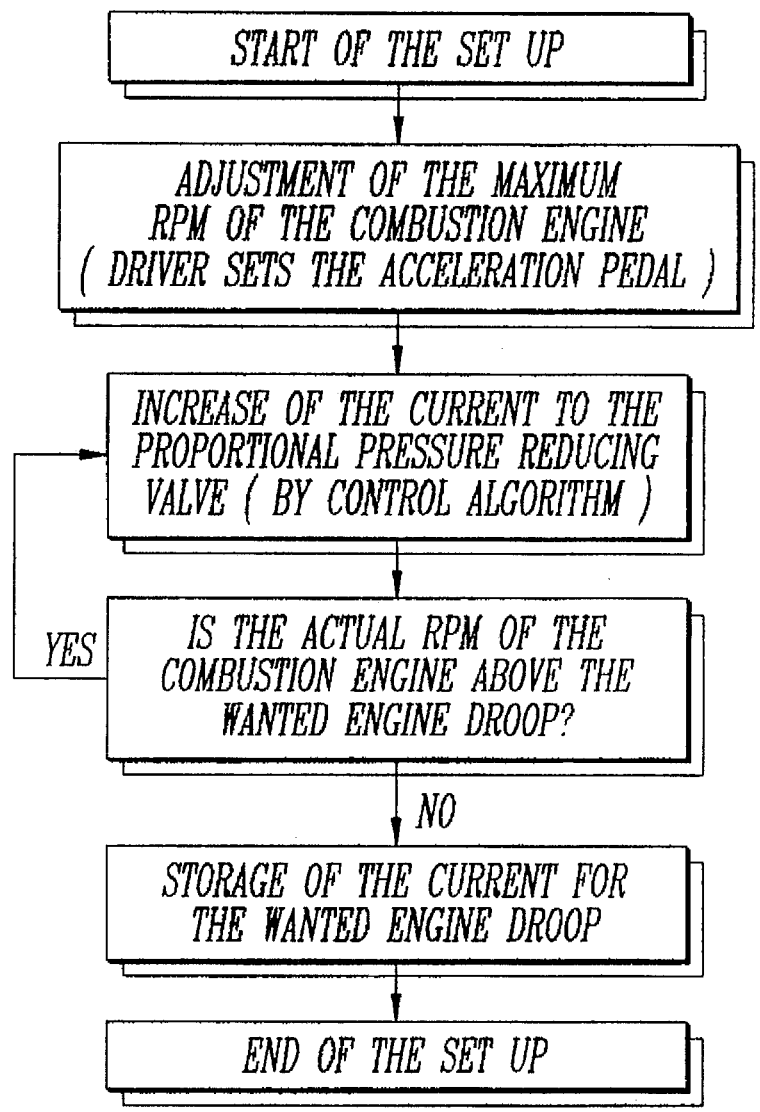
FIG. 5 is a block diagram which shows the procedure of the set-up for the adjustment of the speed reduction on the speed characteristic of the diesel engine.

In order to adjust the borderline speed for speed reduction on the speed characteristic, the operator presses the accelerator at maximum accelerating position for the also blocked vehicle. Now the internal combustion engine 1 operates at high speed. When increasing the output current to the proportional pressure-reducing valves 7, 8, the variable displacement pump 2 increases displacement more and more and simultaneously increases the system pressure up to the maximum pressure. Upon further increase, the flow rate increases at maximum high pressure through the pressure-reducing valves, 4, 13. Due to the maximum pressure and increasing swashplate angle, the torque of the variable displacement pump 2 increases and the speed of the internal combustion engine 1 reduces. The output current to the proportional pressure-reducing valves 7 or 8, respectively, is now increased as long as the desired borderline speed for speed reduction on the speed characteristic of the internal combustion engine is detected or achieved, respectively, by the speed sensor 10. The electronic control 14 stores the values for the output current for the two proportional pressure-reducing valves 7, 8 corresponding to the two driving directions of the vehicle. The procedure of the set-up mode for this case of adjusting the speed reduction on the speed characteristic is illustrated in FIG. 5.

The current characteristic values determined in such a way are used in the electronic control 14 for calculating a current characteristic in order to achieve a desired behavior for forward motion as well as backward motion, and driving properties reproducible from vehicle to vehicle. Such a current characteristic is shown in FIG. 6.

Figure 3:
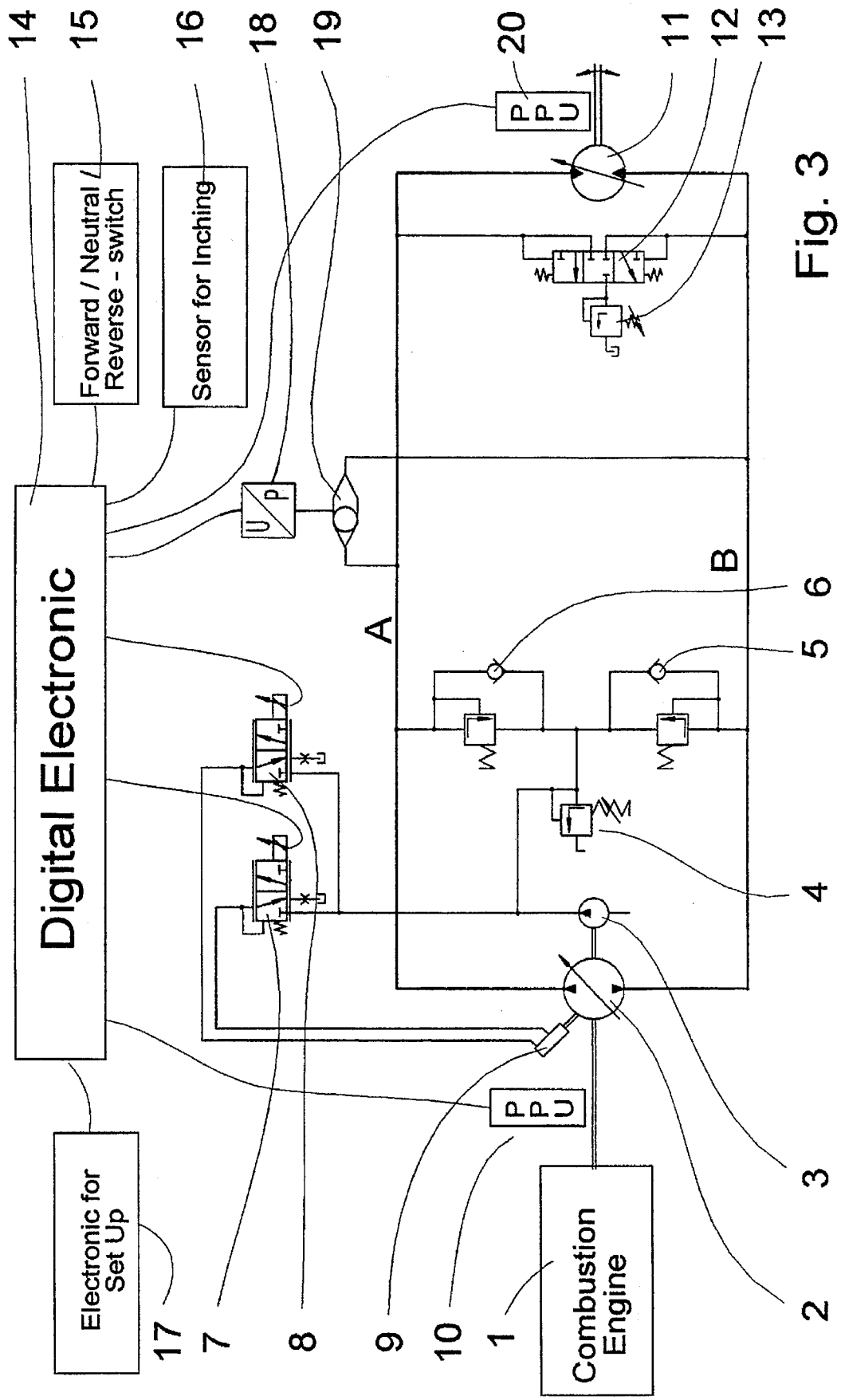
FIG. 3 is a schematic view of a third embodiment of the invention which shows, in addition to the embodiment according to FIG. 2, a speed sensor at the outlet of the hydraulic motor.

Another embodiment of the invention is illustrated in FIG. 3. In addition to the embodiment shown in FIG. 2, the embodiment illustrated in FIG. 3 shows a further speed sensor 20 on the hydraulic motor 11 for detecting the output speed. This speed sensor 20 can also be used for automatically detecting the starting-up speed as well as to gain the values for the start-up current. This reading-in process into the electronic control 14 works similarly as the one described above; but instead of the pressure sensor 18, only the speed sensor 20 is used here. During this reading-in process, the vehicle is not blocked, but gets into the driving state. Thus, the start-up is recognized by the electronic control 14 corresponding to the signal from the speed sensor 20.

In case the sensors used for putting-into-operation the above procedure, or for the control and regulation device, respectively, remain in the vehicle, the characteristic values, (for example for starting-up and achieving the maximum high pressure in the operation of the vehicle during the initial runs), can be generated automatically. Hence, the electronic control 14 can determine its characteristic values on its own without a special set-up procedure and can optimize the system.

From the foregoing, it is seen that this invention will achieve at least all of its objectives.

What is claimed is:

1. A method for putting into operation a vehicle having an electronically controlled automotive hydrostatic transmission comprising a variable displacement pump (2) driven by an internal combustion engine (1), having a servo system (9), a hydraulic motor (11) and an electronic control (14), wherein an output current of the electronic control (14) is used by means of at least one proportional pressure-reducing valve (7, 8) for generating a control pressure acting upon the servo system (9) of said variable displacement pump (2), characterized by a) defining a limit value of a driving regime of the vehicle;

b) detecting, digitizing and reading-in at least one current operational parameter of the transmission into the electronic control (14);

c) detecting and storing at least one characteristic value of the output current of the electronic control (14) corresponding to a value of the driving regime of the transmission for at least one proportional pressure-reducing valve (7, 8); and d) calculating a current characteristic on the basis of said value of the output current for achieving reproducible driving properties.

2. The method of claim 1, wherein the characteristic values for the driving regime during the initial runs are generated after commencing the operation, whereby, the electronic control (14) determines an optimum current characteristic.

3. The method of claim 1 wherein the driving regime includes starting-up.

4. The method of claim 1 wherein the driving regime includes achieving a maximum high pressure.

5. The method of claim 1 wherein the driving regime includes achieving of a borderline speed for a speed reduction on a speed characteristic.

6. The method of claim 1 wherein an output speed of the internal combustion engine (1) is used.

7. The method of claim 1 wherein an output speed of the hydraulic motor (11) is used.

8. The method of claim 1 wherein a high pressure in working mains (A, B) connecting the variable displacement pump (2) and said hydraulic motor (11) is used.

9. The method of claim 1 wherein at constant speed of the internal combustion engine, the output current to the proportional pressure-reducing valve (7, 8) is increased if a high pressure in working mains (A, B) or a speed at the hydraulic motor (11) is sufficient, and the vehicle starts moving with its start-up speed.

10. The method of claim 1 wherein at maximum position of an accelerator and blocked vehicle, the output current to the proportional pressure-reducing valve (7, 8) is increased while a speed of the internal combustion engine decreases down to a borderline speed for speed reduction on a speed characteristic.

11. A control and regulation means for putting into operation a vehicle having an electronically controlled automotive hydrostatic transmission which comprises a variable displacement pump (2) driven by an internal combustion engine (1) having a servo system (9), a hydraulic motor (11), which is connected through working mains (A, B), and an electronic control (14), an output current of which controls at least one proportional pressure-reducing valve (7, 8) for controlling the servo system (9) acting on the variable displacement pump (2), and by means of this controls a pressure in the working mains (A, B), sensors (10, 18, 20) being provided for the determination of a speed of the internal combustion engine (1) and/or said hydraulic motor (11) and/or the determination of the pressure in the working mains (A, B), characterized in that a diagnosis device (17) is provided for setting-up of driving regime data in the electronic control (14); and the output current for the proportional pressure-reducing valve (7, 8) corresponding to values determined by said sensors (10, 18, 20) is controllable by means of the electronic control (14) such that by means of the driving regime data and said output current, a current characteristic reproducing driving properties is generable.

12. The control and regulation means according to claim 11, wherein the sensor (20) for the determination of the pressure is connected to said working mains (A, B) through a shuttle valve (19).

13. The control and regulation means according to claim 11 wherein said diagnosis device (17) is operatively connected to a computer.

14. A control and regulation means according to claim 11 wherein the output current of the electronic control (14) is capable of reaching limit values of the respective driving regime data and the output current corresponding to respective limit value being adapted to generating said current characteristic.

* * * * *